United States Patent
Sethi et al.

(10) Patent No.: US 11,748,086 B2
(45) Date of Patent: Sep. 5, 2023

(54) AUTOMATED SOFTWARE UPGRADE DOWNLOAD CONTROL BASED ON DEVICE ISSUE ANALYSIS

(71) Applicant: Dell Products L.P., Round Rock, TX (US)

(72) Inventors: Parminder Singh Sethi, Ludhiana (IN); Aarsi Kumar, Bengaluru (IN); Kanika Kapish, Muzaffarnagar (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/155,197

(22) Filed: Jan. 22, 2021

(65) Prior Publication Data

US 2022/0236973 A1  Jul. 28, 2022

(51) Int. Cl.
  *G06F 8/65* (2018.01)
  *G06F 11/36* (2006.01)
  *H04L 41/082* (2022.01)

(52) U.S. Cl.
  CPC .............. *G06F 8/65* (2013.01); *G06F 11/368* (2013.01); *H04L 41/082* (2013.01)

(58) Field of Classification Search
  CPC ......... H04L 41/082; G06F 11/368; G06F 8/65
  See application file for complete search history.

(56) References Cited

U.S. PATENT DOCUMENTS

| | | | | |
|---|---|---|---|---|
| 8,694,983 B1* | 4/2014 | Sobel | ........................ | G06F 8/60 |
| | | | | 717/168 |
| 2009/0196186 A1* | 8/2009 | Lidstrom | ............ | H04L 41/0631 |
| | | | | 370/241 |
| 2012/0099417 A1* | 4/2012 | Sun | ........................ | H04W 24/04 |
| | | | | 370/216 |

(Continued)

FOREIGN PATENT DOCUMENTS

WO  WO-2020159548 A1 *  8/2020  .............. G06F 11/14

OTHER PUBLICATIONS

M. Nandi et al., "Density-Based Clustering," https://blog.dominodatalab.com/topology-and-density-based-clustering/, Accessed Jan. 11, 2021, 38 pages.

(Continued)

*Primary Examiner* — S. Sough
*Assistant Examiner* — Cheneca Smith
(74) *Attorney, Agent, or Firm* — Ryan, Mason & Lewis, LLP

(57) ABSTRACT

An apparatus comprises a processing device configured to detect that a given software upgrade is available for a given computing device, to identify other computing devices on which the given software upgrade has been installed that exhibit at least a threshold level of similarity to the given computing device, and to determine whether any issues were encountered on the other computing devices as a result of the given software upgrade. The processing device is also configured to generate a recommendation as to whether to initiate download of the given software upgrade on the given (Continued)

computing device based at least in part on whether any issues were encountered on the other computing devices as a result of the given software upgrade, and to initiate download of the given software upgrade on the given computing device based at least in part on the generated recommendation.

20 Claims, 9 Drawing Sheets

(56) References Cited

U.S. PATENT DOCUMENTS

| 2015/0178064 | A1  | 6/2015 | Cairns et al. |
| 2015/0242302 | A1  | 8/2015 | Butler et al. |
| 2017/0091069 | A1* | 3/2017 | Fujiwara ............... G06F 8/65 |
| 2017/0109225 | A1  | 4/2017 | Xia et al. |
| 2018/0203752 | A1* | 7/2018 | Howie ............... G06F 11/3452 |
| 2019/0042398 | A1* | 2/2019 | Prasad ............... G06F 11/3684 |
| 2021/0109843 | A1* | 4/2021 | Datta ............... G06F 11/3636 |

OTHER PUBLICATIONS

Dell Technologies "SupportAssist for PCs and Tablets," Frequently Asked Questions, Nov. 20, 2020, 6 pages.
Dell Technologies "SupportAssist for PCs and Tablets," User Guide, Jun. 2015, 14 pages.
Dell Technologies "Dell SupportAssist for Client Systems," Jul. 2016, 2 pages.

* cited by examiner

AUTOMATED SOFTWARE UPGRADE DOWNLOAD CONTROL BASED ON DEVICE ISSUE ANALYSIS

FIELD

The field relates generally to information processing, and more particularly to device management in information processing systems.

BACKGROUND

Support platforms may be utilized to provide various services for computing devices managed by the support platforms. Such services may include, for example, troubleshooting and remediation of issues encountered on computing devices managed by a support platform. This may include periodically collecting information on the state of the managed computing devices, and using such information for troubleshooting and remediation of the issues. Services of a support platform may also or alternatively include management of software that is installed on computing devices. This may include various software vendors communicating with the support platform when upgrades are available for different applications or other software, and the support platform may push such upgrades to the computing devices that it manages.

SUMMARY

Illustrative embodiments of the present disclosure provide techniques for automated software upgrade download control based at least in part on device issue analysis.

In one embodiment, an apparatus comprises at least one processing device comprising a processor coupled to a memory. The at least one processing device is configured to perform the steps of detecting that a given software upgrade is available for a given computing device, identifying one or more other computing devices on which the given software upgrade has been installed that exhibit at least a threshold level of similarity to the given computing device, and determining whether any issues were encountered on the one or more other computing devices as a result of the given software upgrade. The at least one processing device is also configured to perform the steps of generating a recommendation as to whether to initiate download of the given software upgrade on the given computing device based at least in part on whether any issues were encountered on the one or more other computing devices as a result of the given software upgrade, and initiating download of the given software upgrade on the given computing device based at least in part on the generated recommendation.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
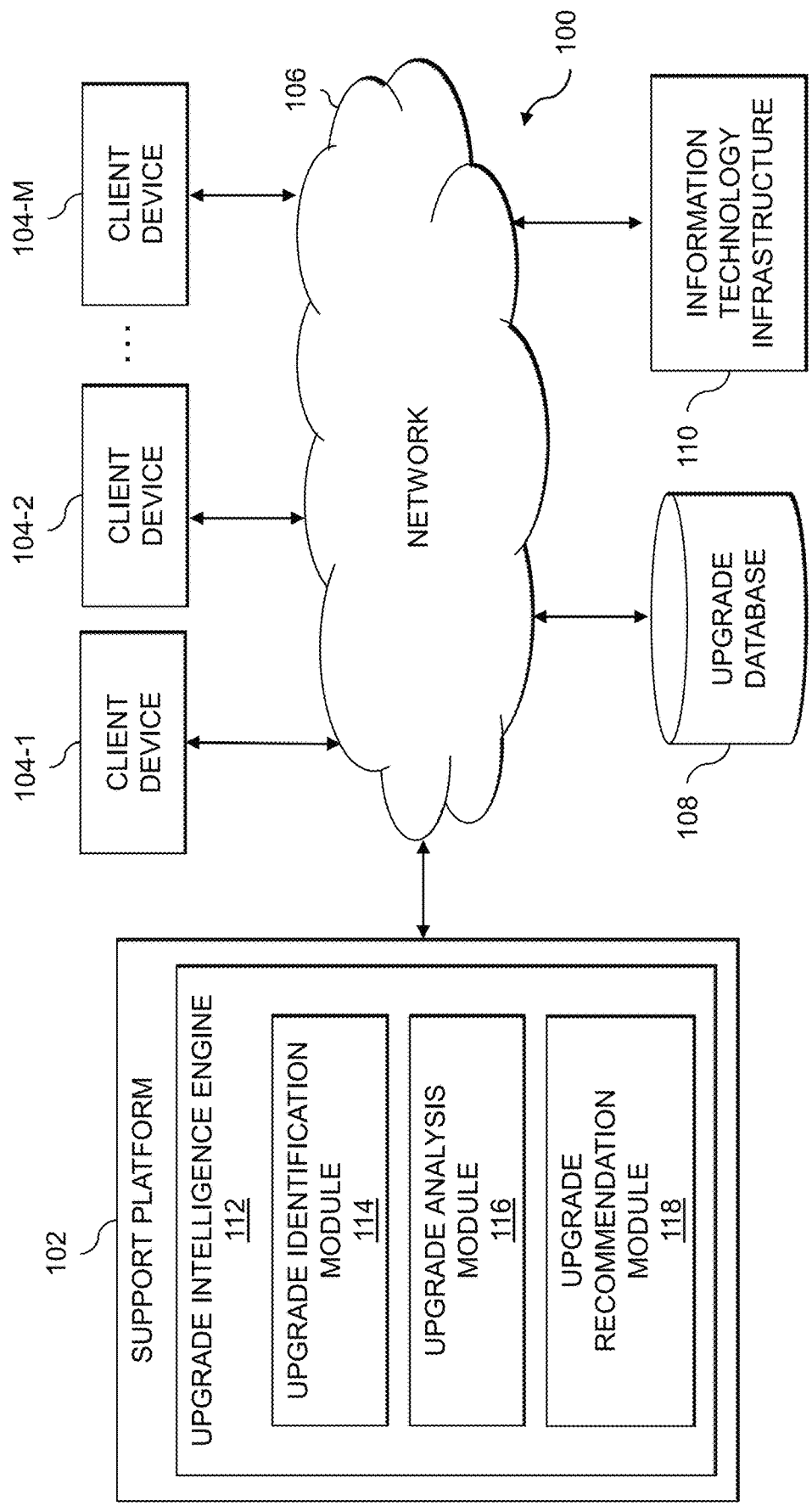
FIG. 1 is a block diagram of an information processing system configured for determining whether to download software upgrades on computing devices based at least in part on issues encountered with the software upgrades on other computing devices in an illustrative embodiment.

FIG. 1 shows an information processing system 100 configured in accordance with an illustrative embodiment. The information processing system 100 is assumed to be built on at least one processing platform and provides functionality for determining whether to download software upgrades on computing devices based at least in part on issues encountered with the software upgrades on other computing devices.

The term "application or other software upgrade" is intended to be construed broadly. For example, an application or other software upgrade (also referred to as simply a software upgrade) may include changing an existing application or other piece of software (e.g., an operating system (OS), basic input-output software (BIOS), device drivers, etc.). Changing an existing application or other piece of software may include updating an application or other piece of software to a different version (e.g., which includes updating to a newer version, rolling back to a previous version, etc.). Such updates may involve patching or changing the existing application or other piece of software, or uninstalling the existing application or other piece of software followed by installation of the different version of the existing application or other piece of software. An application or other software upgrade may alternatively include upgrading one or more components or features of an existing application or other piece of software, while leaving other components or features of the existing application or other piece of software unchanged. This illustratively includes installing add-ons or plugins to existing applications or other pieces of software. An application or other software upgrade may alternatively include installation of a new application or other piece of software altogether, rather than upgrading an existing application or other piece of software or component thereof. For simplicity below, an application or other software upgrade may be referred to simply as an "upgrade," "application upgrade" or "software upgrade."

The system 100 includes a support platform 102, which is configured to provide support for a set of client devices 104-1, 104-2, ... 104-M (collectively, client devices 104), assets of an information technology (IT) infrastructure 110 (e.g., physical and virtual computing resources in the IT infrastructure 110), etc. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc. The support platform 102, client devices 104 and IT infrastructure 110 are coupled to a network. Also coupled to the network 106 is an upgrade database 108, which may store various information relative to application or other software upgrades as will be described in further detail below.

In some embodiments, the support platform 102 is used for an enterprise system. For example, an enterprise may subscribe to or otherwise utilize the support platform 102 to manage upgrades for a set of assets (e.g., assets of the IT infrastructure 110), client devices 104 operated by users of the enterprise, etc. As used herein, the term "enterprise system" is intended to be construed broadly to include any group of systems or other computing devices. For example, the assets of the IT infrastructure 110 may provide a portion of one or more enterprise systems. A given enterprise system may also or alternatively include one or more of the client devices 104. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. Thus, the client devices 104 may be considered examples of assets of an enterprise system. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The upgrade database 108, as discussed above, is configured to store and record information relating to application and other software upgrades. Such information may include, for example, indications of available upgrades, historical data regarding issues encountered during or after installation of upgrades on one or more of the client devices 104 and/or assets of the IT infrastructure 110, etc. The upgrade database 108 in some embodiments is implemented using one or more storage systems or devices associated with the support platform 102. In some embodiments, one or more of the storage systems utilized to implement the upgrade database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 102, as well as to support communication between the support platform 102 and other related systems and devices not explicitly shown.

The client devices 104 are configured to access or otherwise utilize the IT infrastructure 110. In some embodiments, the client devices 104 are assumed to be associated with system administrators, IT managers or other authorized personnel responsible for managing assets of the IT infrastructure 110 (e.g., where such management includes control over whether to install upgrades on one or more of the assets of the IT infrastructure 110). For example, a given one of the client devices 104 may be operated by a user to access a graphical user interface (GUI) provided by the support platform 102 to manage the assets of the IT infrastructure 110. The support platform 102 may be provided as a cloud service that is accessible by the given client device 104 to allow the user thereof to manage the assets of the IT infrastructure 110. In some embodiments, the assets of the IT infrastructure 110 are owned or operated by the same enterprise that operates the support platform 102 (e.g., where an enterprise such as a business provides support for the assets it operates). In other embodiments, the assets of the IT infrastructure 110 may be owned or operated by one or more enterprises different than the enterprise which operates the support platform 102 (e.g., a first enterprise provides support for assets that are owned by multiple different customers, business, etc.). Various other examples are possible.

In other embodiments, the support platform 102 may provide support for the client devices 104, instead of or in addition to providing support for assets of the IT infrastructure 110. For example, the support platform 102 may be operated by a hardware vendor that manufactures and sells computing devices (e.g., desktops, laptops, tablets, smartphones, etc.), and where the client devices 104 represent computing devices sold by that hardware vendor. The support platform 102, however, is not required to be operated by a hardware vendor that manufactures and sells computing devices. Instead, the support platform 102 may be offered as a service to provide support for computing devices that are sold by any number of hardware vendors. The client devices 104 may subscribe to the support platform 102, so as to provide support including management of upgrades for applications or other software of the client devices 104. Various other examples are possible.

In some embodiments, the client devices 104 may implement host agents that are configured for automated transmission of information regarding state of the client devices 104 (e.g., such as in the form of telemetry information periodically provided to the support platform 102). Such host agents may also be configured to automatically receive from the support platform 102 recommendations for whether to download and install upgrades for applications or other software of the client devices 104. The host agents may also enable fully automated or "silent" upgrades (e.g., upgrades to applications or other software which do not require manual user action) when the support platform 102 determines that the such upgrades are not likely (e.g., as defined using some threshold likelihood, which may be user-defined) to cause issues on the client devices 104.

It should be noted that a "host agent" as this term is generally used herein may comprise an automated entity, such as a software entity running on a processing device. Accordingly, a host agent need not be a human entity.

As shown in FIG. 1, the support platform 102 comprises an upgrade intelligence engine 112. As will be described in further detail below, the upgrade intelligence engine 112 is configured to proactively determine whether upgrades should be installed on the client devices 104 or assets of the IT infrastructure 110.

Although shown as an element of the support platform 102 in this embodiment, the upgrade intelligence engine 112 in other embodiments can be implemented at least in part externally to the support platform 102, for example, as a stand-alone server, set of servers or other type of system coupled to the network 106. In some embodiments, the support platform 102 and/or the upgrade intelligence engine 112 may be implemented at least in part within one or more of the client devices 104 and/or the IT infrastructure 110.

The upgrade intelligence engine 112 in the FIG. 1 embodiment is assumed to be implemented using at least one processing device. Each such processing device generally comprises at least one processor and an associated memory, and implements one or more functional modules for controlling certain features of the upgrade intelligence engine 112. In the FIG. 1 embodiment, the upgrade intelligence engine 112 comprises an upgrade identification module 114, an upgrade analysis module 116, and an upgrade recommendation module 118.

The upgrade identification module 114 is configured to determine that an upgrade is available for a given one of the client devices 104 or a given asset of the IT infrastructure 110. The upgrade analysis module 116 is configured to determine whether the upgrade has the potential to cause issues on the given client device 104 or the given asset of the IT infrastructure 110. This may include determining one or more other client devices 104 or assets of the IT infrastructure 110 that are similar to the given client device 104 or the given asset of the IT infrastructure 110 that have previously installed the upgrade. Based on whether such similar client devices 104 or similar assets of the IT infrastructure 110 have encountered issues when installing the upgrade, the upgrade analysis module 116 will determine a likelihood that the given client device 104 or the given asset of the IT infrastructure 110 will also encounter an issue. The upgrade recommendation module 118 is configured to generate a recommendation as to whether to push the upgrade to the given client device 104 or the given asset of the IT infrastructure based on the determined likelihood that the given client device 104 or the given asset of the IT infrastructure 110 will encounter an issue with the upgrade.

It is to be appreciated that the particular arrangement of the support platform 102, the upgrade intelligence engine 112, the upgrade identification module 114, the upgrade analysis module 116 and the upgrade recommendation module 118 illustrated in the FIG. 1 embodiment is presented by way of example only, and alternative arrangements can be used in other embodiments. As discussed above, for example, the support platform 102, the upgrade intelligence engine 112, the upgrade identification module 114, the upgrade analysis module 116, and the upgrade recommendation module 118 may in some embodiments be implemented internal to one or more of the client devices 104 and/or the IT infrastructure 110. As another example, the functionality associated with the upgrade identification module 114, the upgrade analysis module 116, and the upgrade recommendation module 118 may be combined into one module, or separated across more modules with the multiple modules possibly being implemented with multiple distinct processors or processing devices.

At least portions of the upgrade identification module 114, the upgrade analysis module 116, and the upgrade recommendation module 118 may be implemented at least in part in the form of software that is stored in memory and executed by a processor.

It is to be understood that the particular set of elements shown in FIG. 1 for determining whether to download software upgrades on computing devices based at least in part on issues encountered with the software upgrades on other computing devices is presented by way of illustrative example only, and in other embodiments additional or alternative elements may be used. Thus, another embodiment may include additional or alternative systems, devices and other network entities, as well as different arrangements of modules and other components.

By way of example, in other embodiments, the upgrade intelligence engine 112 may be implemented external to the support platform 102, such that the support platform 102 can be eliminated.

The support platform 102 and other portions of the system 100, as will be described in further detail below, may be part of cloud infrastructure.

The support platform 102 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104, IT infrastructure 110 and the support platform 102 or components thereof (e.g., the upgrade intelligence engine 112, the upgrade identification module 114, the upgrade analysis module 116 and the upgrade recommendation module 118) may be implemented on respective distinct processing platforms, although numerous other arrangements are possible. For example, in some embodiments at least portions of the support platform 102 and one or more of the client devices 104 or the IT infrastructure 110 are implemented on the same processing platform. A given client device (e.g., 104-1) can therefore be implemented at least in part within at least one processing platform that implements at least a portion of the support platform 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the support platform 102, client devices 104, IT infrastructure 110, or portions or components thereof, to reside in different data centers. Numerous other distributed implementations are possible. The support platform 102 can also be implemented in a distributed manner across multiple data centers.

Additional examples of processing platforms utilized to implement the support platform 102 in illustrative embodiments will be described in more detail below in conjunction with FIGS. 8 and 9.

It is to be appreciated that these and other features of illustrative embodiments are presented by way of example only, and should not be construed as limiting in any way.

An exemplary process for determining whether to download software upgrades on computing devices based at least in part on issues encountered with the software upgrades on other computing devices will now be described in more detail with reference to the flow diagram of FIG. 2. It is to be understood that this particular process is only an example, and that additional or alternative processes for determining whether to download software upgrades on computing devices based at least in part on issues encountered with the software upgrades on other computing devices may be used in other embodiments.

In this embodiment, the process includes steps 200 through 208. These steps are assumed to be performed by the upgrade intelligence engine 112 of the support platform 102 utilizing the upgrade identification module 114, the upgrade analysis module 116 and the upgrade recommendation module 118. The process begins with step 200, detecting that a given software upgrade is available for a given computing device (e.g., one of the client devices 104, an asset in the IT infrastructure 110). In step 202, one or more other computing devices (e.g., other ones of the client devices 104 or assets in the IT infrastructure 110) that exhibit at least a threshold level of similarity to the given computing device are identified.

Step 202 may include obtaining telemetry data from a plurality of computing devices including the given computing device and the one or more other computing devices, the telemetry data characterizing at least one of hardware and software configurations of the plurality of computing devices, and selecting a subset of the plurality of computing devices as the one or more other computing devices exhibiting at least the threshold level of similarity to the given computing device based at least in part on a comparison of at least one of the hardware and software configuration of the given computing device and the hardware and software configurations of the one or more other computing devices. The hardware configurations of the plurality of computing devices may comprise at least one of: manufacturer and model number identifiers of the plurality of computing devices; manufacturer and model number identifiers of one or more hardware components of the plurality of computing devices; and state of the one or more hardware components of the plurality of computing devices. The software configurations of the plurality of computing devices may comprise at least one of: software installed on the plurality of computing devices; versions of the software installed on the plurality of computing devices; software running on the plurality of computing devices when one or more issues were encountered.

Figure 2:
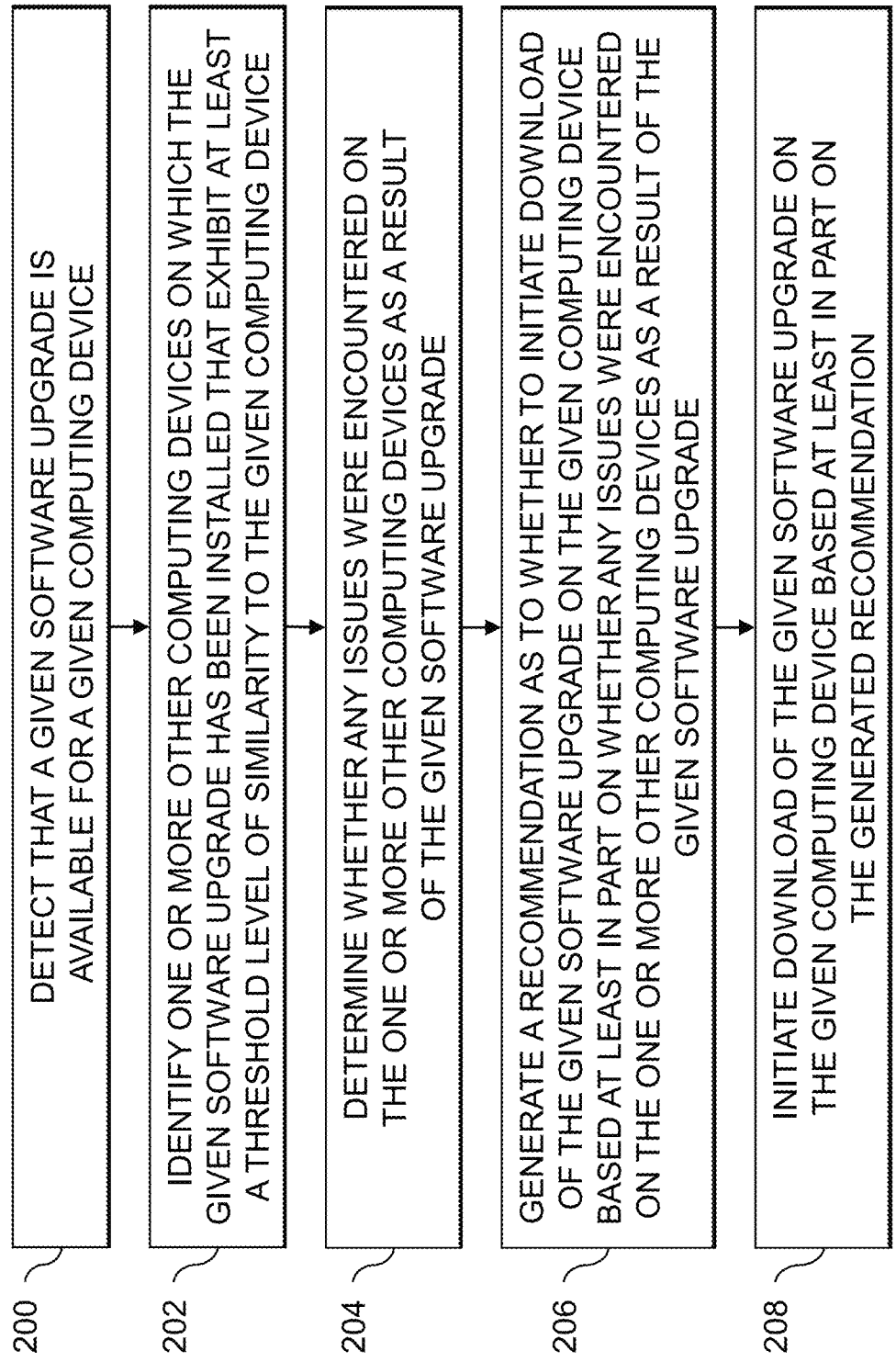
FIG. 2 is a flow diagram of an exemplary process for determining whether to download software upgrades on computing devices based at least in part on issues encountered with the software upgrades on other computing devices in an illustrative embodiment.

The FIG. 2 process continues with step 204, determining whether any issues were encountered on the one or more other computing devices as a result of the given software upgrade. In step 206, a recommendation is generated as to whether to initiate download of the given software upgrade on the given computing device based at least in part on whether any issues were encountered on the one or more other computing devices as a result of the given software upgrade. Download of the given software upgrade is initiated on the given computing device in step 208 based at least in part on the generated recommendation.

Step 204 may include determining whether installation of the given software upgrade failed on any of the one or more other computing devices, and determining whether, following successful installation of the given software upgrade, any of the one or more other computing devices experienced performance impacts. Step 204 may also or alternatively include utilizing a clustering algorithm to generate clusters of issue types for the given software upgrade based on a set of clustering factors. The clustering algorithm may comprise a density based clustering algorithm. The set of clustering factors may comprise: alerts raised for issues encountered on respective ones of the one or more other computing devices, the alerts being associated with at least one of issues encountered due to installation of the given software upgrade and issues encountered following successful installation of the given software upgrade; telemetry data collected from the one or more other computing devices at least one of prior to installation of the given software upgrade and following successful installation of the given software upgrade; and information relating to one or more other software upgrades that caused issues on the one or more other computing devices. The clusters of issue types for the given software upgrade may comprise a first cluster for issues associated with failure installing the given software upgrade, a second cluster for issues associated with performance impacts following installation of the given software upgrade, and a third cluster for issues associated with system failure following installation of the given software upgrade.

In some embodiments, step 204 further includes determining whether the one or more other computing devices exhibiting at least the threshold level of similarity to the given computing device are matched with any of the generated clusters of issue types for the given software upgrade. Responsive to determining that the one or more other computing devices exhibiting at least the threshold level of similarity to the given computing device are matched with a given one of the generated clusters of issue types for the given software upgrade, root causes for the issues associated with given generated cluster are identified. Steps 206 and 208 may include converting the identified root causes to one or more validation tests, running the one or more validation tests on the given computing device, responsive to the one or more validation tests passing on the given computing device, initiating download of the given software upgrade on the given computing device automatically, and responsive to at least one of the one or more validation tests failing on the given computing device, pushing one or more warnings to the given computing device and initiating download of the given software upgrade on the given computing device responsive to acceptance of the one or more warnings. Steps 206 and 208 may further or alternatively include converting the identified root causes to one or more warnings, pushing the one or more warnings to the given computing device, and initiating download of the given software upgrade on the given computing device responsive to acceptance of the one or more warnings.

In some embodiments steps 206 and 208 include determining a probability that the given computing device will encounter one or more issues due to installation of the given software upgrade based at least in part on whether any issues were encountered on the one or more other computing devices as a result of the given software upgrade. Responsive to the determined probability that the given computing device will encounter one or more issues due to installation of the given software upgrade being below a designated threshold probability, steps 206 and 208 may include initiating download of the given software upgrade on the given computing device automatically. Responsive to the determined probability that the given computing device will encounter one or more issues due to installation of the given software upgrade being at or above the designated threshold probability, steps 206 and 208 may include pushing one or more warnings to the given computing device and initiating download of the given software upgrade on the given computing device responsive to acceptance of the one or more warnings.

Illustrative embodiments provide proactive solutions for notifying end-users of the potential effects of upgrades (e.g., potential failure or other issues during upgrade, potential issues likely to be faced after an upgrade is installed, etc.) prior to initializing download of the upgrade to end-user systems.

Any upgrade, when sent out from a vendor (e.g., a software application vendor) into the market has an undetermined tendency to fail on some portion of the systems (e.g., client devices 104, assets of the IT infrastructure 110, etc.) on which the software upgrade is installed. Such failure may include failure of the software upgrade installation itself, causing issues on systems after a software upgrade is successfully installed, etc. If an upgrade fails or causes issues post completion leading to obstructions or other issues on a system with a specific configuration, subsequently that upgrade may tend to fail or cause similar issues on other systems with similar configurations. This may lead to a cascade of failure or other adverse after-effects as the upgrade is pushed out to such systems with similar configurations. There is a need for mechanisms that will terminate such cascade of failure or other adverse after-effects, resulting from pushing an upgrade to the other systems having similar configurations to a system on which the upgrade has previously failed or caused issues, as and when the very first issue is encountered.

The failure of an upgrade can have significant impacts, both to end-users and to application vendors. For example, end-users may be aggrieved that they have to deal with a failed upgrade or potential adverse after-effects of upgrades that are successfully completed. In some cases, end-users may stop using the application or other software that was upgraded (as well as potentially all applications or other software from an application vendor that is a source of the upgrade which failed or caused adverse after-effects following successful completion).

End-users may run support software on their devices. In some cases, the support software may be offered by the manufacturer of an end-user's device (e.g., Dell SupportAssist). The support software is configured to analyze data collected from end-user devices to diagnose and remediate issues encountered thereon. Consider, as an example, an incident that widely affects end-user devices running support software, where a sudden abundance of Blue Screen of Death (B SOD) alerts were observed. Upon analysis, it may be observed that such end-user devices are encountering BSOD issues multiple times a day. Deep manual analysis may involve filtering based upon end-user device model or other characteristics (e.g., installed applications, device state, etc.) that are facing the issue. For all such end-user devices facing the issue, telemetry information collected before and after the issue is encountered are compared to discover that the software telemetry has irregularities and thus the issue is a result of applications or software running on the end-user devices. Upon analyzing the common software upgrades of all such end-user devices, it may be identified that a video driver upgrade was pushed to such end-user devices leading to the frequent BSOD issue. This analysis, however, is highly manual since the end-user devices and applications thereon may undergo automatic or silent upgrades such that the end-users may not even be aware that the upgrades are happening on their devices. As a result, there may be a significant delay before the root cause of issues are identified, where during this delay the issue may be cascaded to many end-user devices.

Whenever an upgrade is parceled out into the market, it may be manifested with a compatibility matrix that specifies the operating system (OS) versions and series of hardware that the upgrade supports. Despite having the same system models, the same upgrade may cause issues on some end-user devices but not others. For example, the same upgrade may cause issues post successful installation of the upgrade on some systems, while failing on others and succeeding for the rest. This may result from end-users having the liberty to alter their associated system configurations as per individualistic requirements, or may be a result of the way the systems are being used by the end-users.

Any issue associated with an upgrade or its failure may propagate on all devices which have similar configurations or which are in similar states. On all these devices, the issues or failures are encountered reactively with the process flow but the damage made often cannot be reversed without significant cost. Moreover, as many end-users opt for silent or automatic upgrades, the end-users may not be aware of the background changes that are applied to their devices through such upgrades and may suddenly face strange issues and get stuck not knowing the way to resolve such issues. As discussed above, in some cases an upgrade may be pushed and a large mass of end-user devices may start encountering frequent BSOD issues causing significant disruption. There is thus a need for techniques for notifying end-users of the potential after-effects of upgrades (e.g., the potential issues likely to be faced post upgrade, potential failures during upgrade, etc.) even before the download of the upgrades are initialized on the end-user devices to give the end-users control to decide whether software upgrades should be installed or not with minimal end-user interaction and effort. This also advantageously saves bandwidth and other network, processing and storage resources of the end-user devices, by avoiding download of upgrades that are likely to cause failure or other adverse after-effects If an upgrade causes severe issues on end-user devices after successful installation, or if the upgrade fails on some end-user devices, this may be detected by the application vendor in various ways. In some cases, the application or software that is upgraded may be configured to notify the vendor backend of the issues (e.g., adverse after-effects, upgrade failure, etc.) or the end-user would directly inform the vendor. For end-user devices that run certain support software, the support software may communicate with a support platform backend when an upgrade fails or otherwise causes adverse after-effects. The support software may in turn communicate such issues to the application vendor, but this may be too late or not proactive enough to stop propagation of the potentially problematic upgrade to a large number of end-user devices. Issues encountered following successful installation of upgrades make these problems even worse, as it is difficult and time consuming to manually analyze and identify that the issues faced are due to specific upgrades. As discussed above, it may take significant time to co-relate issues encountered on different end-user devices to identify the actual root cause for issues (e.g., frequent BSOD issues).

Issues may be encountered on various types of end-user devices, including desktops, laptops, tablets, smartphones, etc. For example, many applications on smartphones are configured to automatically or silently upgrade. After a problematic upgrade, performance of the smartphone may be tremendously deteriorated (e.g., hang-ups or freezing, battery underperforming, etc.). Multiple releases may need to be parceled out over a period of time before an application vendor is able to identify the root cause and provide appropriate remediation. The damage, however, is already done during such delay. By the time that a vendor discovers a failure or potentially problematic upgrade, the upgrade may have caused massive obstructions on end-user devices or be on the verge of doing so leaving little or no time for the vendor to provide a fix. Consequently, as a remedial action a new upgrade may need to be rolled out to fix the issues. Such approaches are reactive (e.g., "lazy") and time-consuming, and may only be handled towards the very end of an upgrade cycle. In addition to impacting performance of end-user devices, this can also lead to extensive business losses (e.g., for the application vendor).

Figure 3:
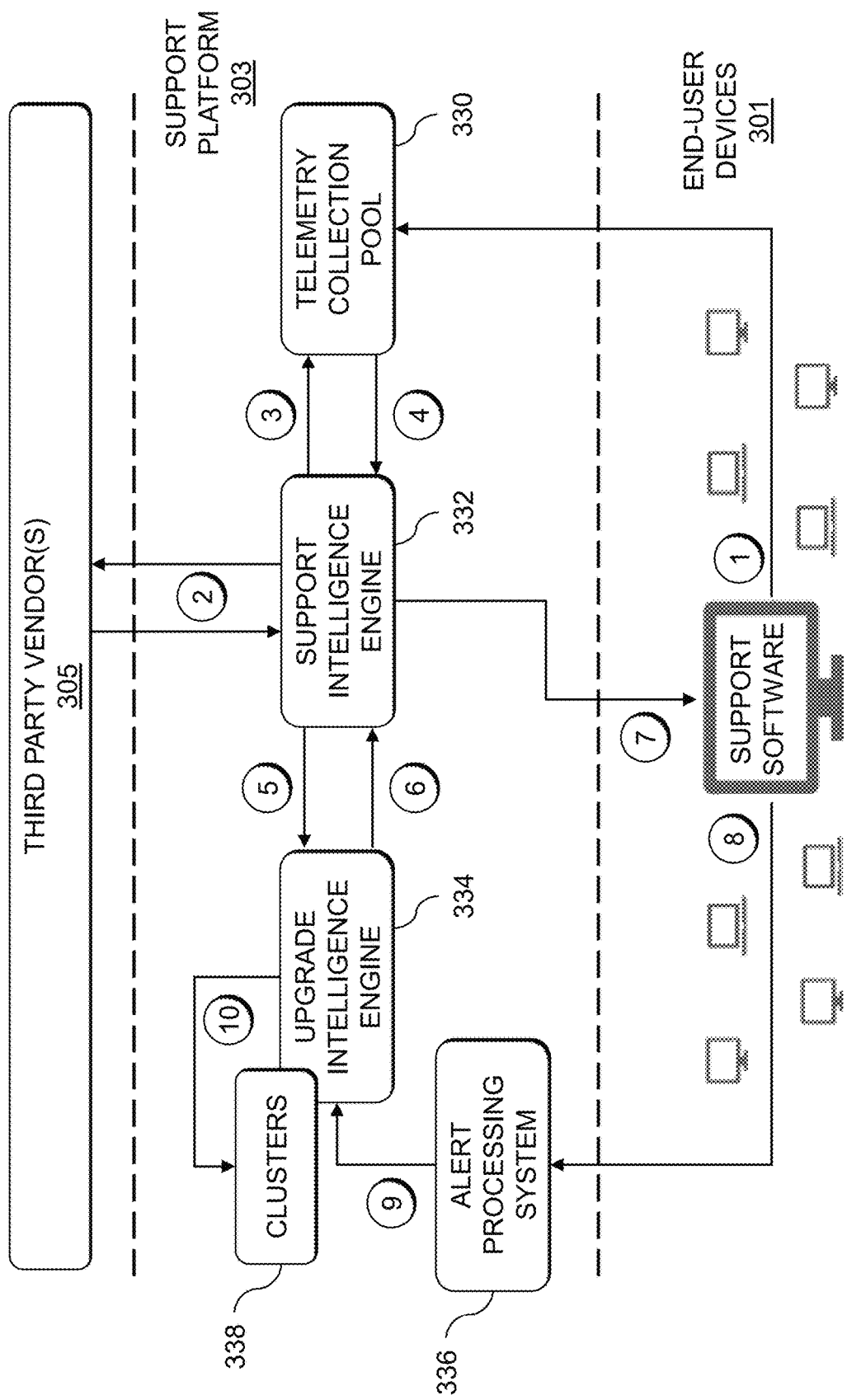
FIG. 3 shows a system flow for proactively determining whether upgrades for applications or other software are likely to cause issues in an illustrative embodiment.

FIG. 3 shows an example environment, which includes a set of end-user devices 301, where each of the end-user devices 301 is assumed to run support software configured to interact with components of a support platform 303. The support platform 303 is also configured to interact with third-party vendors 305, which in this example are assumed to be the source of upgrades that are pushed to the end-user devices 301. It should be appreciated, however, that the vendor providing the support platform 303 may be one of the third-party vendors 305. The support platform 303 in the FIG. 3 embodiment includes various elements, including a telemetry collection pool 330, a support intelligence engine 332, an upgrade intelligence engine 334, an alert processing system 336, and a clustering module 338. FIG. 3 also labels processing flows 1-10, which will be now be described.

Flow 1: End-User Devices 301 to Support Platform 303

The support platform 303, via the telemetry collection pool 330, is configured to periodically collect telemetry information from the end-user devices 301. The telemetry data envelops the device details, as well as the state of all components of the end-user devices 301. The telemetry data is uploaded to the telemetry collection pool 330 in the support platform 303.

Flow 2: Third-Party Vendors 305 to Support Platform 303

The support platform 303 is also configured to interact with the third party vendors 305. For example, whenever an application or other software has an upgrade available, the third party vendors 305 may notify the support platform 303, which in turn notifies the support software running on the end-user devices 301.

Flow 3: Support Intelligence Engine 332 Interaction with Collection Backend

The support intelligence engine 332 of the support platform 303 is configured to fetch details of the end-user devices 301 that currently have an "older" or previous version of an application or other software that has an upgrade available (e.g., as notified via flow 2).

Flow 4: Telemetry Collection Pool 330 to Support Intelligence Engine 332

The telemetry collection pool 330 returns the details of the end-user devices 301, including the currently installed versions of the application or other software that is to be upgraded by the available upgrade. The support intelligence engine 332 then identifies the end-user devices 301 eligible for the available upgrade. Absent use of the techniques described herein, after identifying the eligible end-user devices 301, the upgrade would be pushed out to all the eligible end-user devices 301. As detailed above, however, on some portion of these end-user devices 301 the upgrade may fail or causes issues post installation. Such issues may get propagated and spread like fire on all the end-user devices 301 with similar configurations. To terminate or prevent the propagation of such failures or issues during or post upgrade, illustrative embodiments make use of the upgrade intelligence engine 334 of the support platform 303. The upgrade intelligence engine 334 provides functionality for determining whether particular upgrades will be beneficial or not for different ones of the end-user devices 301.

Flow 5: Support Intelligence Engine 332 to Upgrade Intelligence Engine 334

The support intelligence engine 332 queries the upgrade intelligence engine 334 to determine whether particular upgrades should be pushed to different ones of the end-user devices 301.

Flow 6: Upgrade Intelligence Engine 334 to Support Intelligence Engine 332

The upgrade intelligence engine 334 determines whether upgrades are a good fit for different ones of the end-user devices 301 (e.g., whether the upgrades are likely to fail or result in issues following successful installation). If a given upgrade is a good fit for a given one of the end-user devices 301, the upgrade intelligence engine 334 grants a "green flag" and the support intelligence engine 332 pushes the given upgrade to the given end-user device 301. However, if the given upgrade has previously recorded issues on other ones of the end-user devices 301 having similar configurations as the given end-user device 301, warnings may be communicated to the given end-user device 301 (or to other devices or users responsible for managing the given end-user device 301). In some embodiments, the warnings may include what the potential issues are, recommendations regarding resolutions for the potential issues, etc.

Flow 7: Support Intelligence Engine 332 to End-User Devices 301

As a result of flows 5 and 6 (e.g., based on output of the upgrade intelligence engine 334), the support intelligence engine 332 will determine whether to push upgrades to different ones of the end-user devices 301. Where there are potential issues, the software upgrades may still be pushed to different ones of the end-user devices 301 if users thereof (or users responsible for managing such end-user devices 301) have reviewed and accepted warnings and recommendations. The warnings and recommendations passed may include the probability of failure or other issues occurring during or post upgrade.

Flow 8: End-User Devices 301 to Alert Processing System 336

After either a green signaled upgrade (e.g., an upgrade with no known potential issues or failure), or upon acceptance of warnings and recommendations presented to the end-user devices 301 in flow 7, if a pushed upgrade causes issues then alerts will be raised by the end-user devices 301 and passed to the alert processing system 336. Such alerts may indicate the type of issue (e.g., failure during upgrade, issues post successful upgrade, etc.) and other pertinent information such as device state.

Flow 9: Alert Processing System 336 to Upgrade Intelligence Engine 334

The upgrade intelligence engine 334 internally works with a rigorous synchronization with the alert processing system 336. The upgrade intelligence engine 334 in flow 10, described in further detail below, clusters alerts for a given upgrade and uses such information to determine whether to push the given upgrade to other ones of the end-user devices 301 (e.g., in subsequent iterations of flows 5-7).

Flow 10: Clustering of Alerts Using Clustering Module 338

The upgrade intelligence engine 334 utilizes the clustering module 338 to categorize alerts received from the alert processing system 336 based on various factors. Such factors may include, but are not limited to, categorizing alerts based on behavior, type, etc. Received alerts may be added to existing alert clusters if they already exist, otherwise new alert clusters may be generated.

Consider a given available upgrade received by the support intelligence engine 332 of the support platform 303 from one of the third party vendors 305 in an instance of flow 2. Meanwhile, telemetry collection for the end-user devices 301 is done and uploaded to the telemetry collection pool 330 of the support platform 303 in flow 1. Consider that a given one of the end-user devices 301, referred to as a System A, is eligible for the given available upgrade. The software intelligence engine of the support platform 303 queries the upgrade intelligence engine 334 using flow 5 to determine whether the given available upgrade should be pushed to System A. The upgrade intelligence engine 334 will refer to the clusters (e.g., created in flow 10), and may determine that the given available software upgrade has a clean history (e.g., no alerts have been tagged). In such a case, the upgrade intelligence engine 334 of the support platform 303 has no alert-based cluster formed, and the upgrade intelligence engine 334 of the support platform 303 in flow 6 directs the support intelligence engine 332 to push the available software upgrade to System A using flow 7.

Subsequent to pushing the given available upgrade to System A using flow 7, however, consider a scenario where System A is encountering frequent BSOD issues and thus alerts are being raised and provided to the alert processing system 336 of the support platform 303 using flow 8. The alert processing system of the support platform 303 provides such alerts to the upgrade intelligence engine 334 of the support platform 303 in flow 9. The upgrade intelligence engine 334 of the support platform 303 receives the alerts (e.g., such as in the form of support tickets with details encountered either during the upgrade installation or post upgrade) from the alert processing system 336 of the support platform 303. The upgrade intelligence engine 334 of the support platform 303 in flow 10 may thus form new clusters for each distinctive issue (e.g., BSOD alerts into one cluster, performance issues in another cluster, and so on for all the issues on the different systems to which the given available software upgrade was pushed).

Further consider another one of the end-user devices 301, referred to as System B, which has a similar configuration as System A. The support intelligence engine 332 of the support platform 303 may again query the upgrade intelligence engine 334 of the support platform 303 using flow 5 to determine whether the given available software upgrade should be pushed to System B. The upgrade intelligence engine 334 of the support platform 303 will again examine the clusters to determine if any issues have been reported for similarly-configured systems (as per the telemetry information collected from end-user devices 301, including System A, in flow 1). During this examination of the clusters, since the BSOD issues were reported on System A with a similar configuration as System B, the upgrade intelligence engine 334 of the support platform 303 in flow 6 will pass on a warning to the support intelligence engine 332 of the support platform 303. The warning may include various information, such as the probability of the risk of frequent BSOD issues post upgrade. The warning is passed from the support intelligence engine 332 of the support platform 303 to System B in flow 7, allowing an end-user of System B (or a user responsible for managing System B) to decide whether to upgrade or not.

In this way, illustrative embodiments provide functionality for notifying users of the potential after-effects of upgrades (e.g., potential issues likely to be faced following a successful upgrade, failures during upgrade, etc.) even before the download of the upgrade is initialized on the end-user devices 301. For example, a pop-up or other notification is displayed to the user if an upgrade is likely to cause issues, which will tend to terminate or prevent propagation of failure or other issues resulting from potentially problematic software upgrades while retaining functionality for automatic or silent software upgrades (e.g., for those software upgrades that are not potentially problematic).

Assume that an upgrade is available for a given application "ABC" for which no issues have been reported. The support platform 303 will find that an update is available for the application "ABC" from one of the third party vendors 305. Before recommending this upgrade to the user or performing any automatic action (e.g., silent upgrade), the support intelligence engine 332 and/or support software such as a device management tool on a given one of the end-user devices 301 will reach out to the upgrade intelligence engine 334 of the support platform 303. The upgrade intelligence engine 334 in this case will proactively determine whether the upgrade is likely to provide issues on the given end-user device 301 even before the upgrade is downloaded to the given end-user device 301. Again, in this case it is assume that the upgrade for the "ABC" application has no reported issues and thus the upgrade intelligence engine 334 gives a "green flag" or other approval to the upgrade. The given end-user device 301 (e.g., via support software such as a device management tool installed thereon) will trigger automatic download of the upgrade and/or present a notification to the user responsible for managing the given end-user device 301 indicating that the upgrade is safe or not likely to fail or cause issues.

Now assume that the upgrade for the "ABC" application is available, and that failure or post-upgrade issues have been previously reported for the upgrade. Again, before recommending the upgrade for the "ABC" application, the upgrade intelligence engine 334 is consulted. In this case, the upgrade intelligence engine 334 finds some unsatisfactory history attached to the upgrade, and the upgrade intelligence engine 334 will pull the historical issues, behavior, root causes and solutions provided. This information will be converted into validation tests and/or warnings as described elsewhere herein. Only after the validation tests all pass or the user accepts the warnings will the support software or device management tool on the given end-user device 301 proceed with downloading the upgrade.

Figure 4:
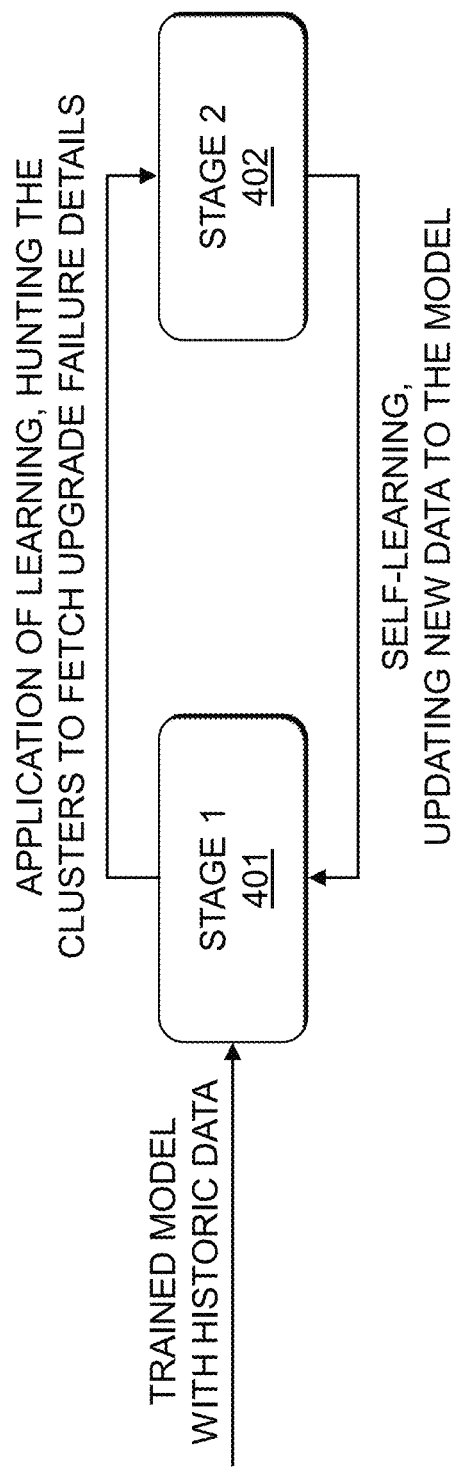
FIG. 4 shows a system flow for phases of proactively determining whether upgrades for applications or other software are likely to cause issues in an illustrative embodiment.

FIG. 4 illustrates stages of processing by the upgrade intelligence engine 334 of the support platform 303, as well as interconnectivity between the processing stages. FIG. 4 illustrates two stages 401 and 402, also referred to as stage 1 and stage 2. The first stage 401 is responsible for alert-based clustering, while the second stage 402 is responsible for identifying if a software upgrade is to be pushed, and potentially whether warnings and recommendations should be presented regarding the probability of any issues occurring during or post upgrade.

The first stage 401 may commence with distinct clusters of different alerts. The alerts may be in the form of cases or support tickets. A model is trained by feeding the historic data of all the alerts ever encountered for application upgrades monitored by the support platform 303 via support software running on the end-user devices 301, as well as past third party upgrades. In some embodiments, density based clustering techniques are used, which leverage such historic alert data concerning all upgrades and clusters them together for the purposes of initial model training The second stage 402 consumes the learning of the model trained in the first stage 401. If any issue has been observed in the past regarding a given upgrade (e.g., if there is any underlying cluster having the issues tagged with the upgrade and with an analysis of the same), then warnings, recommendations and the probability of encountering an issue during or post upgrade are identified. If any issue is observed post upgrade that was never encountered for the given upgrade, the first stage 401 again comes into picture and self-learning is activated forming a new cluster for the new issue category. Thus, the processing of the first stage 401 and the second stage 402 go hand in hand.

The first stage 401 envelops the model of self-learning of alert clustering as discussed above. The support platform 303, in some embodiments, has the capability to manage the end-user devices 301. As part of the device management, the support platform 303 gets the alerts for irregularities encountered on the end-user devices 301 (e.g., via the alert processing system 336 of the support platform 303). Such alerts may be generated in response to irregularities such as performance issues, BSOD issues, etc. The alerts may be processed as "cases" to be resolved, such as in the form of support tickets. When the cases or support tickets are picked up to be resolved as per manual analysis, they may be tagged with a root cause. Thus, if an issue has occurred due to an upgrade (e.g., where the application or software may be provided by the vendor of the support platform 303 or one or more of the third party vendors 305), it will be tagged with the case or support ticket. Therefore, the support platform 303 possesses the data specifying the different types and counts of alerts raised due to upgrades.

In some embodiments, density based clustering techniques leverage the historic data of alerts (which, as noted above, may be represented as cases and/or support tickets) concerning all upgrades, and clusters them together for the purpose of initial model training. Density based clustering is a data clustering algorithm that groups together points close to each other based on some distance measurement, with some minimum number of points being required to form a cluster. The capability to mark low density region points as outliers provides advantages.

Figure 5:
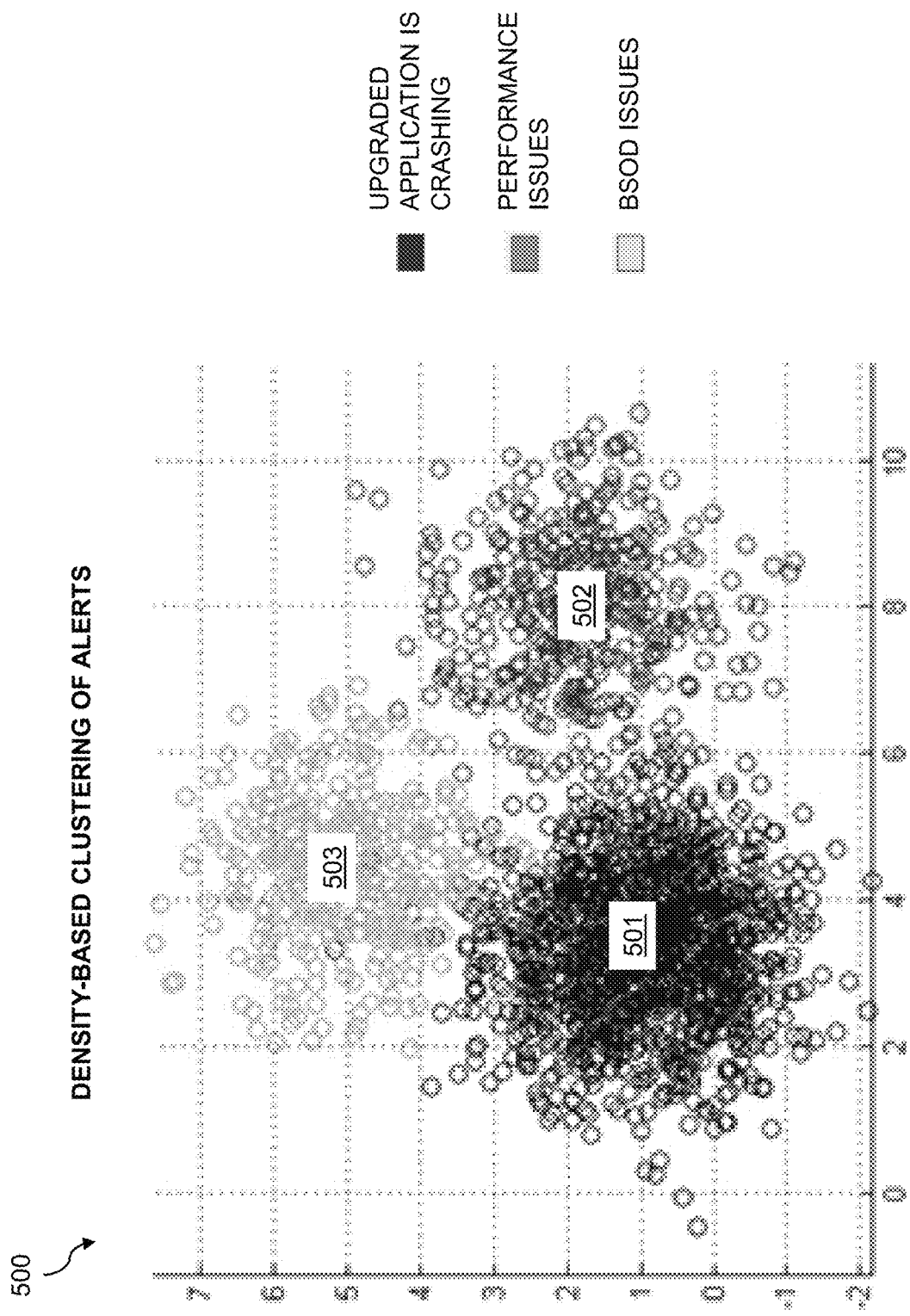
FIG. 5 shows a plot of density-based clustering of alerts for upgrades in an illustrative embodiment.

FIG. 5 shows an example plot 500 of density based clustering of alerts. As shown in the plot 500, the concept of density based clustering is used in order to group alerts. More particularly, the plot 500 shows how different alerts are clustered into a first cluster 501 for upgraded applications that are crashing, a second cluster 502 for upgraded applications causing performing issues, and a third cluster 503 for upgraded applications causing BSOD issues.

Apart from the trained data of historical alerts, some embodiments also enable self-learning clustering capability. Clustering may be done based on various factors, including: alerts; telemetry collection; and older faulty upgrades. If any case, support ticket or other alert is tagged to be either observed during the processing of upgrade installation of post upgrade, such information is used for clustering. Periodic telemetry collection is an ongoing process (e.g., conducted continuously or at regular intervals on end-user devices 301). The telemetry collection may comprise system details with the state of each component, and thus with each telemetry collection the overall state of a system or device is captured. It should be noted that telemetry information collected prior to or preceding an upgrade may be a major factor for clustering. Older faulty upgrades may also be considered while clustering, as proposed solutions from resolved support tickets fetches all the older upgrades which might have caused failure on the end-user devices 301 in the past.

Different behaviors of cases, support tickets or other alerts are clustered together further considering the telemetry collection to fetch the system state including the system configurations as well as the other pushed upgrades to do the precise mapping of alerts to upgrades. Consider, as an example, an upgrade "Y.0" for a third party application "X" that was made available and pushed to the end-user devices 301. Following the upgrade, BSOD issues were observed on some of the end-user devices 301, while performance issues were observed on other ones of the end-user devices 301. On still other ones of the end-user devices 301, the upgrade installation itself failed (e.g., such as due to lack of available storage space). These three examples would be grouped into the clusters 501, 502 and 503 as shown in plot 500 of FIG. 5. Now, adding upon the clusters of the trained dataset, if any new cases, support tickets or other alerts are subsequently tagged under the same upgrade "Y.0" for the third party application "X", it is identified if a cluster already exists as per the various clustering factors. If there is no existing cluster, a new cluster may be created (e.g., for newly observed issues). Accordingly, self-learning capability of the clustering module 338 is provided.

Figure 6:
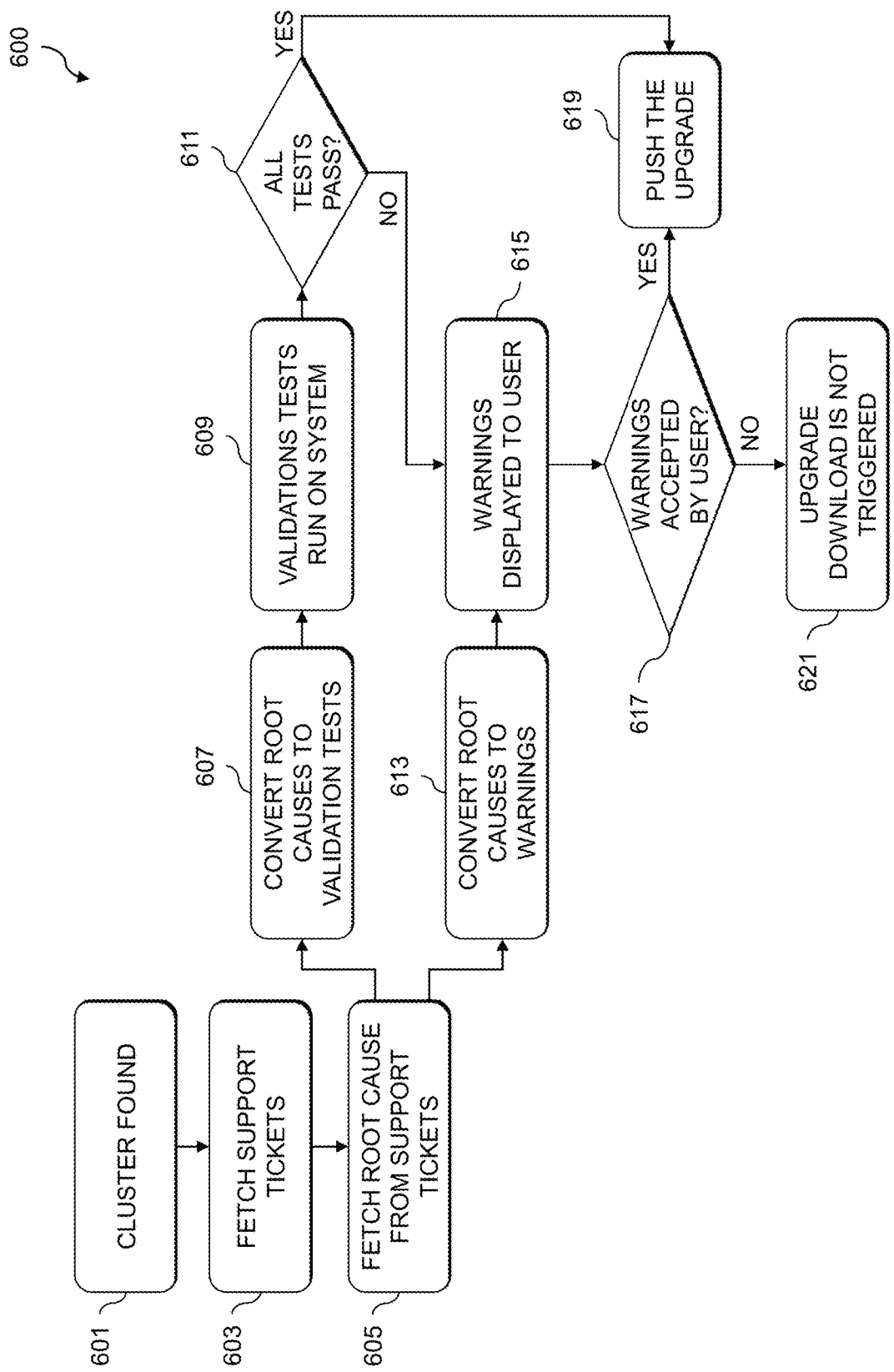
FIG. 6 shows a process flow for determining whether to push software upgrades in an illustrative embodiment.

The second stage 402 commences as soon as a given upgrade is found to be available for a given one of the end-user devices 301. As described above with respect to FIG. 3, this may result in the support intelligence engine 332 querying the upgrade intelligence engine 334 (e.g., using flow 5) to see if there are any clusters available. The clusters illustratively include information on older faulty upgrades, telemetry collection from systems on which failure or other issues resulting from the given upgrade happened, and cases, support tickets or other alerts raised as part of these failures or for post-upgrade issues. This is done to find out if any failures were seen previously due to the given upgrade on any other ones of the end-user devices 301. If any clusters are found when the upgrade intelligence engine 334 is queried, the process flow 600 of FIG. 6 may be initiated.

The process flow 600 begins with the upgrade intelligence engine 334 finding a cluster in step 601. In step 603, cases, support tickets or other alerts are fetched for the given upgrade. Such cases, support tickets or other alerts may be raised previously and include failure of the given upgrade, post-upgrade issues, etc. for ones of the end-user devices 301 that are similar to the given end-user device 301. In step 605, root cause is fetched from the cases, support tickets or other alerts. Cases, support tickets, or alerts are raised when a problem is detected on the end-user devices 301, and such cases, support tickets, and alerts are provided to the alert processing system 336 of the support platform 303 to be resolved. In this process of resolving the cases, support tickets, or other alerts, the root cause of the issue or problem detected is marked along with any solution steps that have been taken to resolve the issue. These root causes are fetched in step 605.

The root causes fetched in step 605 may be processed in two ways in steps 607 and 613 of the process flow 600. In step 607, the root causes are converted to validation tests. For example, there may be a case, support ticket, or alert wherein the after-effect of the given upgrade was post-installation observation of an unexpected increase in usage of random-access memory (RAM) (e.g., ~1 GB of RAM). This can be converted to a validation test, which will run upfront and check if a particular system has room to accommodate this increase in RAM usage without hitting some designated performance threshold of the RAM of that system. The validation tests created in step 607 are performed on the given end-user device 301 in step 609 before the given upgrade is downloaded to the given end-user device 301. In step 611, a determination is made as to whether all of the validation tests pass. If the result of the step 611 determination is yes, the process flow 600 proceeds to step 619 where the given upgrade is pushed to the given end-user device 301. If the result of the step 611 determination is no, the process flow 600 proceeds to step 615 where warnings are displayed to the user of given end-user device 301 (or to one or more users responsible for managing the given end-user device 301). The warning displayed in step 615 may indicate which validation tests failed.

As noted above, the root causes fetched in step 605 may also or alternatively be converted to warnings in step 613. For example, a case, support ticket, or alert may indicate that there were an increased number of BSOD issues post-upgrade, and this may be converted to a warning such as "The given upgrade may increase the frequency of BSOD issues." Such warnings are presented in step 615 (possibly in addition to warnings generated as a result of failure of one or more validation tests as described above). In step 617, a determination is made as to whether the user accepts the warnings presented in step 615. If the result of the step 617 determination is yes, the given upgrade is pushed to the given end-user device 301 in step 619. If the result of the step 617 determination is no, download of the given upgrade is not triggered in step 621. Where cases, support tickets, or alerts have solutions specified, such information may be pulled and set-out as recommendations presented either together with the warnings in step 615, or as a separate step performed in conjunction with pushing the given upgrade to the given end-user device 301 in step 619.

To summarize, when there is a given upgrade available for any application, the support intelligence engine 332 will query the upgrade intelligence engine 334 to determine whether to push the given upgrade to different ones of the end-user devices 301. If there is a "green flag" from the upgrade intelligence engine 334 (e.g., no clusters found), then the given upgrade will be pushed to the end-user devices 301 (e.g., silently, without any required user intervention). If the upgrade intelligence engine 334 does find clusters that are applicable to one or more of the end-user devices 301, then warnings, validations and recommendations come into the picture. The validation tests, for example, may be run in the background and if they all pass for a given one of the end-user devices 301, the given upgrade will be pushed to the given end-user device 301. If one or more of the validation tests fail on the given end-user device 301, however, such failed validation tests may be converted to warnings which are presented to a user. The given upgrade will not be downloaded until the user accepts the warnings. Using these techniques, the user can either rectify the probable issues that the user might face post-upgrade (e.g., by following the validation tests presented or other recommendations included in the warnings) or at least will be notified of what can go wrong to make an informed decision as to whether to proceed with the given upgrade.

In some embodiments, a calculation of the probability of failure of an upgrade, or of encountering issues following a successful installation of an upgrade, is performed. Finding the probability of encountering failure or other issues on a given one of the end-user devices 301 on which a given upgrade has not yet been pushed provides various advantages. By looking at the trends of the given upgrade on other ones of the end-user devices 301 that are similar to the given end-user device 301, a user of that device may make a more informed decision as to whether to download and install the given upgrade. For example, warnings may be presented to the user characterizing the probability percentage of failure of the given upgrade, or of encountering after-effects following installation of the given upgrade. In some embodiments, separate probability percentages may be calculated and presented for different potential effects (e.g., a first probability percentage for failure of the given upgrade, a second probability percentage for encountering issues following installation of the given upgrade, etc.).

Calculation of probability percentages will consider all end-user devices 301 on which a specific version of a given upgrade was previously posted, and the details of events that have occurred on such end-user devices 301 that are attributable to the given upgrade (e.g., whether the given upgrade failed, has caused issues or other adverse after-effects, etc.). Using this information, the probability of an event happening on a given one of the end-user devices 301 under consideration (e.g., a given end-user device 301 on which the given upgrade is yet to be downloaded and installed) is calculated.

Figure 7:
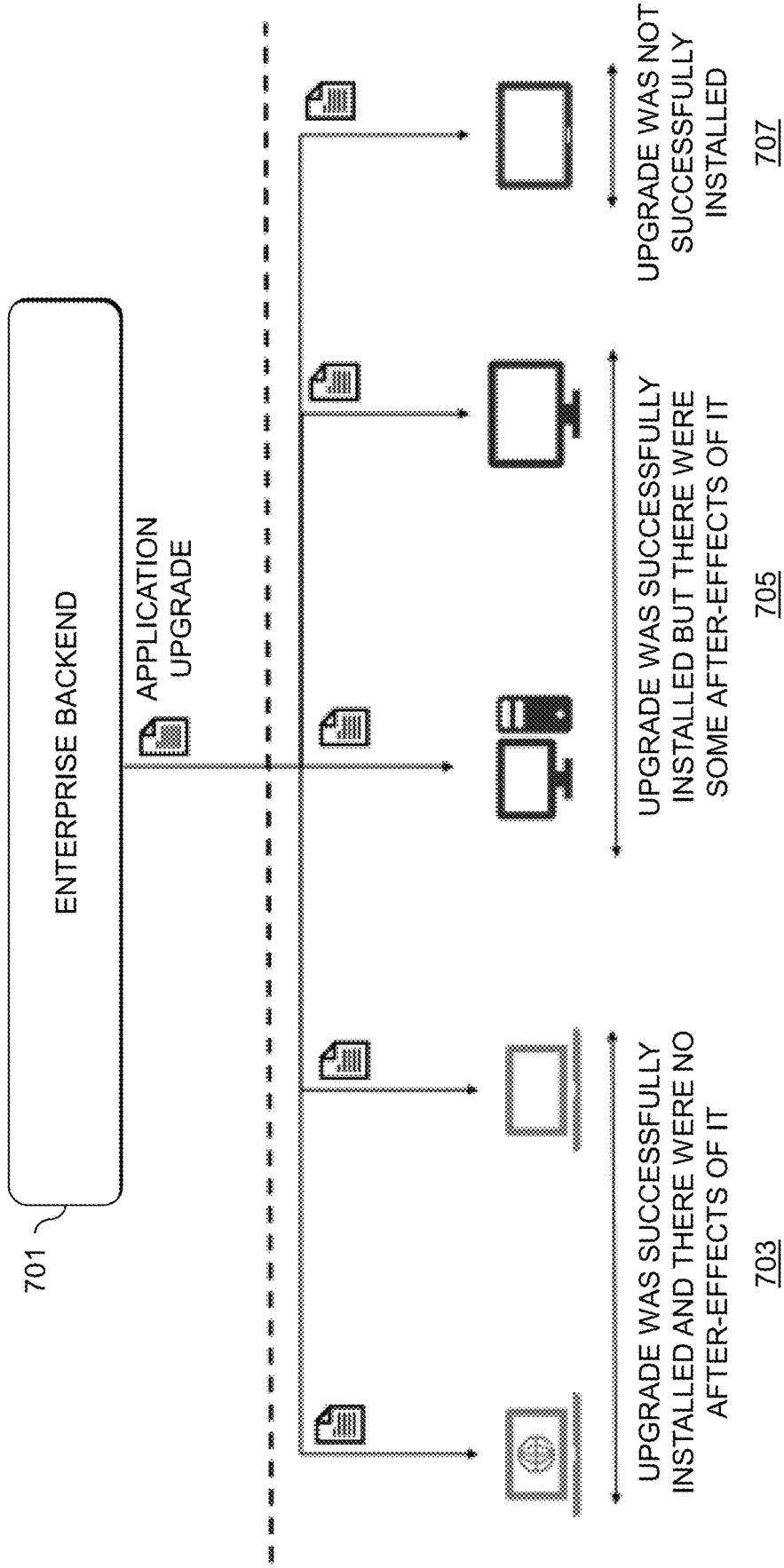
FIG. 7 shows an example of a software upgrade pushed to different devices in an illustrative embodiment.

FIG. 7 illustrates an example of calculation of probability percentages for a given upgrade that is pushed from an enterprise backend 701. The enterprise backend 701 may represent the support platform 303 or one or more of the third party vendors 305 in FIG. 3. Let T represent the total number of systems on which the given upgrade has been pushed so far. Let $N_p$ represent the number of systems 703 on which the given upgrade was successful and no post-upgrade issues have been seen, $N_i$ represent the number of systems 705 on which the given upgrade was successful and post-upgrade issues are seen, and $N_f$ represent the number of systems 707 on which the given upgrade has failed. $N_{tf}$ represents the total number of systems on which some kind of an issue was seen, and is the sum of $N_i$ and $N_f$.

To give a concrete example, assume that T=100, $N_p$=40, $N_i$=40, $N_f$=20, and $N_{tf}$=40+20=60. Therefore, in comparison to the total, the probability that the given upgrade will go through is $$\frac{N_p}{T} = 40\%.$$

The probability that the given upgrade would cause an issue is $$\frac{N_{tf}}{T} = 60\%.$$

This probability may be broken down into different components. The probability that the given upgrade would cause issues post installation is $$\frac{N_i}{N_{fi}} = \frac{40}{60} = 66.66\%.$$

The probability that the given upgrade would fail is $$\frac{N_f}{N_{fi}} = \frac{20}{60} = 33.34\%.$$

Therefore, the techniques described herein enable users to be notified of the potential after-effects of upgrades (e.g., the potential issues likely to be faced after a successful upgrade, potential failures during upgrade) along with the probabilities of such after-effects (e.g., probability of failure during upgrade, probability of facing issues after upgrade). Advantageously, the user is notified of the potential after-effects of upgrades even before download of such upgrades is initialized on user systems. For example, a pop-up or other notification will be displayed to the user if and only if the upgrades are likely to cause issues on the user's system. This allows for terminating the propagation of failure as well as retaining the objective of silent upgrade.

Advantageously, illustrative embodiments provide proactive approaches to warning users of the potential for upgrade failure or negative after-effects, such as damages to serviceability of the user's systems before even downloading upgrades on the user's systems. This is achieved by analyzing an install base and system state of user systems by tapping into telemetry collection, and case, support ticket, and alert information fetched from previous upgrades. Illustrative embodiments thus bring intelligence to support platforms, enabling users to make informed decisions on whether to download upgrades on their devices (e.g., based on whether the upgrades would have any potential negative after-effects, including failure of the upgrades themselves).

In some embodiments, the techniques described herein may be integrated into support platforms and device management tools that manage user systems. Consider a situation where a user's system receives two upgrades where such upgrades happened silently. Because of one of the upgrades, the user's system started having performance issues. Using the techniques described herein, proactive recommendations may be provided indicating that this upgrade has potential negative after-effects and thus improves the silent upgrade journey. Moreover, the solutions described herein do not defeat the purpose of silent upgrades, as the warnings or recommendations may only be provided for critical cases where failure probability or other negative after-effects exceed some designated threshold (e.g., 80% or more, customizable by the user).

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for determining whether to download software upgrades on computing devices based at least in part on issues encountered with the software upgrades on other computing devices will now be described in greater detail with reference to FIGS. 8 and 9. Although described in the context of system 100, these platforms may also be used to implement at least portions of other information processing systems in other embodiments.

Figure 8:
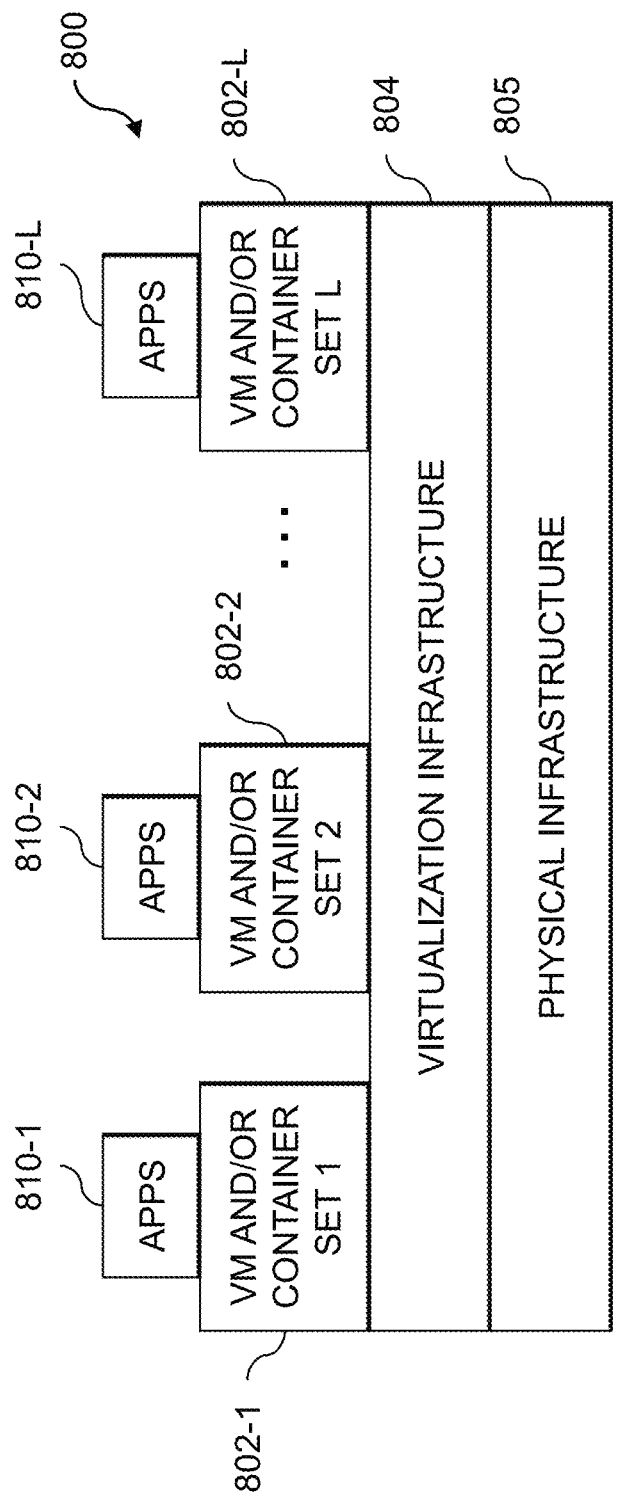
FIGS. 8 and 9 show examples of processing platforms that may be utilized to implement at least a portion of an information processing system in illustrative embodiments.
Figure 9:
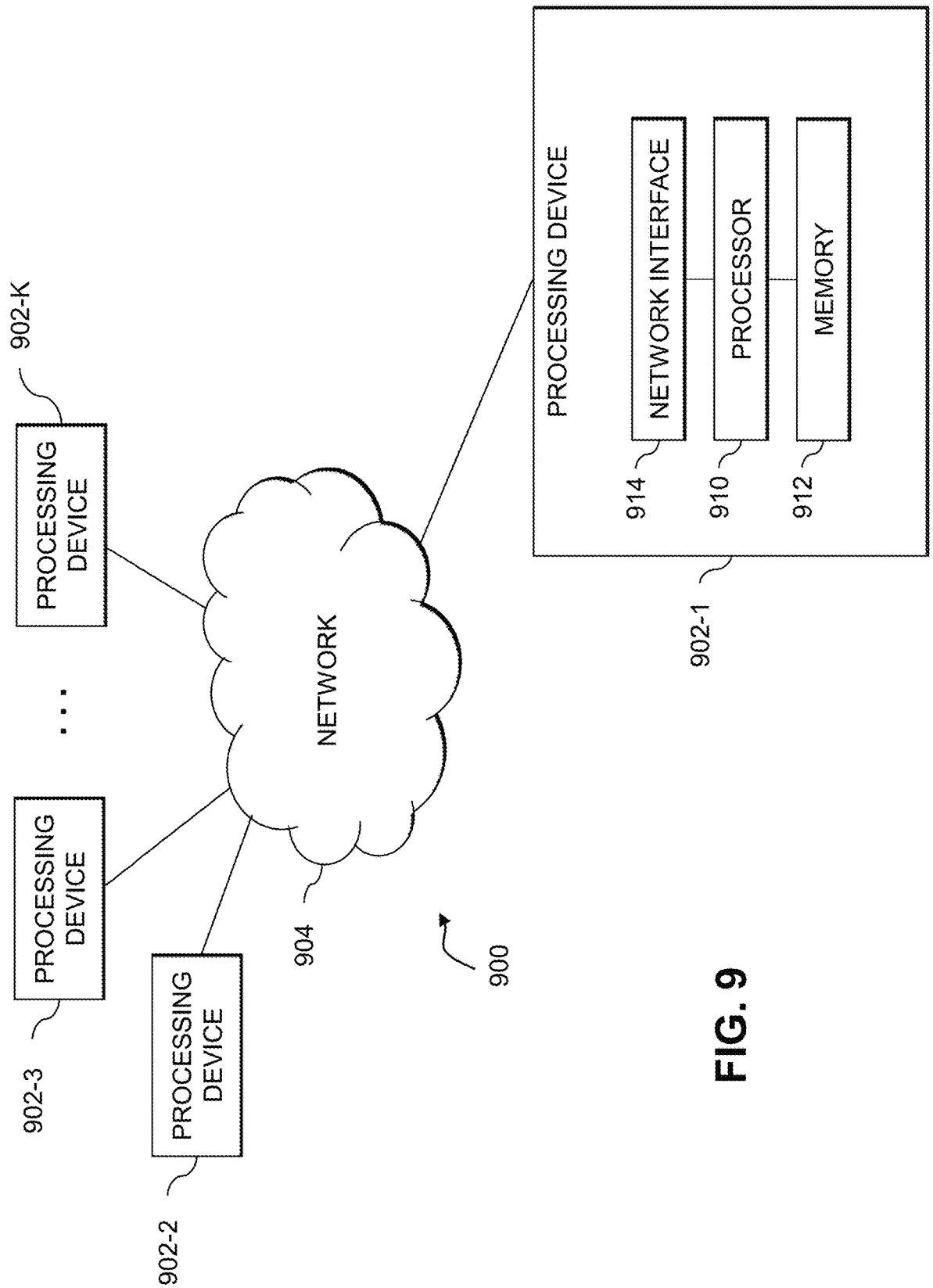

FIG. 8 shows an example processing platform comprising cloud infrastructure 800. The cloud infrastructure 800 comprises a combination of physical and virtual processing resources that may be utilized to implement at least a portion of the information processing system 100 in FIG. 1. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. A hypervisor platform may be used to implement a hypervisor within the virtualization infrastructure 804, where the hypervisor platform has an associated virtual infrastructure management system. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for determining whether to download software upgrades on computing devices based at least in part on issues encountered with the software upgrades on other computing devices as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, end-user devices, clustering techniques, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:
    detecting that a given software upgrade is available for a given computing device;
    identifying one or more other computing devices on which the given software upgrade has been installed that exhibit at least a threshold level of similarity to the given computing device;
    determining whether any issues were encountered on the one or more other computing devices as a result of the given software upgrade;
    generating a recommendation as to whether to initiate download of the given software upgrade on the given computing device based at least in part on whether any issues were encountered on the one or more other computing devices as a result of the given software upgrade; and
    initiating download of the given software upgrade on the given computing device based at least in part on the generated recommendation;
    wherein generating the recommendation as to whether to initiate download of the given software upgrade on the given computing device and initiating download of the given software upgrade based at least in part on the generated recommendation comprise:
        identifying two or more types of issues encountered on the one or more other computing devices as a result of the given software upgrade;
        generating one or more validation tests based at least in part on one or more issues of a first one of the two or more issue types encountered on the one or more other computing devices as a result of the given software upgrade, wherein generating a given one of the one or more validation tests comprises determining a change in resource usage by at least one of the one or more other computing devices as a result of installation of the given software upgrade on said at least one other computing device;

generating one or more warnings based at least in part on one or more issues of a second one of the two or more issue types encountered on the one or more other computing devices as a result of the given software upgrade;
running the one or more validation tests on the given computing device, wherein running the given validation test comprises determining whether available resources of the given computing device are able to accommodate the determined change in resource usage associated with installation of the given software upgrade on said at least one other computing device; and
determining whether to automatically initiate download of the given software upgrade on the given computing device based at least in part on results of the one or more validation tests run on the given computing device and one or more indicators relating to the one or more warnings, the results of the one or more validation tests run on the given computing device characterizing whether the given software upgrade will result in the given computing device experiencing at least one of the one or more issues encountered on the one or more other computing devices as a result of the given software upgrade; and
wherein the method is performed by at least one processing device comprising a processor coupled to a memory.

2. The method of claim 1 wherein determining whether any issues were encountered on the one or more other computing devices as a result of the given software upgrade comprises utilizing a clustering algorithm to generate clusters of issue types for the given software upgrade based on a set of clustering factors, the set of clustering factors comprising:
alerts raised for issues encountered on respective ones of the one or more other computing devices, the alerts being associated with at least one of issues encountered due to installation of the given software upgrade and issues encountered following successful installation of the given software upgrade;
telemetry data collected from the one or more other computing devices at least one of prior to installation of the given software upgrade and following successful installation of the given software upgrade; and
information relating to one or more other software upgrades that caused issues on the one or more other computing devices.

3. The method of claim 2 wherein the clusters of issue types for the given software upgrade comprise a first cluster for issues associated with failure installing the given software upgrade, a second cluster for issues associated with performance impacts following installation of the given software upgrade, and a third cluster for issues associated with system failure following installation of the given software upgrade.

4. An apparatus comprising:
at least one processing device comprising a processor coupled to a memory;
the at least one processing device being configured to perform steps of:
detecting that a given software upgrade is available for a given computing device;
identifying one or more other computing devices on which the given software upgrade has been installed that exhibit at least a threshold level of similarity to the given computing device;
determining whether any issues were encountered on the one or more other computing devices as a result of the given software upgrade;
generating a recommendation as to whether to initiate download of the given software upgrade on the given computing device based at least in part on whether any issues were encountered on the one or more other computing devices as a result of the given software upgrade; and
initiating download of the given software upgrade on the given computing device based at least in part on the generated recommendation;
wherein generating the recommendation as to whether to initiate download of the given software upgrade on the given computing device and initiating download of the given software upgrade based at least in part on the generated recommendation comprise:
identifying two or more types of issues encountered on the one or more other computing devices as a result of the given software upgrade;
generating one or more validation tests based at least in part on one or more issues of a first one of the two or more issue types encountered on the one or more other computing devices as a result of the given software upgrade, wherein generating a given one of the one or more validation tests comprises determining a change in resource usage by at least one of the one or more other computing devices as a result of installation of the given software upgrade on said at least one other computing device;
generating one or more warnings based at least in part on one or more issues of a second one of the two or more issue types encountered on the one or more other computing devices as a result of the given software upgrade;
running the one or more validation tests on the given computing device, wherein running the given validation test comprises determining whether available resources of the given computing device are able to accommodate the determined change in resource usage associated with installation of the given software upgrade on said at least one other computing device; and
determining whether to automatically initiate download of the given software upgrade on the given computing device based at least in part on results of the one or more validation tests run on the given computing device and one or more indicators relating to the one or more warnings, the results of the one or more validation tests run on the given computing device characterizing whether the given software upgrade will result in the given computing device experiencing at least one of the one or more issues encountered on the one or more other computing devices as a result of the given software upgrade.

5. The apparatus of claim 4 wherein identifying one or more other computing devices on which the given software upgrade has been installed that exhibit at least the threshold level of similarity to the given computing device comprises:
obtaining telemetry data from a plurality of computing devices including the given computing device and the one or more other computing devices, the telemetry data characterizing at least one of hardware and software configurations of the plurality of computing devices; and
selecting a subset of the plurality of computing devices as the one or more other computing devices exhibiting at least the threshold level of similarity to the given computing device based at least in part on a comparison of at least one of the hardware and software configuration of the given computing device and the hardware and software configurations of the one or more other computing devices.

6. The apparatus of claim 5 wherein the hardware configurations of the plurality of computing devices comprise at least one of:
manufacturer and model number identifiers of the plurality of computing devices;
manufacturer and model number identifiers of one or more hardware components of the plurality of computing devices; and
state of the one or more hardware components of the plurality of computing devices.

7. The apparatus of claim 5 wherein the software configurations of the plurality of computing devices comprise at least one of:
software installed on the plurality of computing devices;
versions of the software installed on the plurality of computing devices;
software running on the plurality of computing devices when one or more issues were encountered.

8. The apparatus of claim 4 wherein determining whether any issues were encountered on the one or more other computing devices as a result of the given software upgrade comprises:
determining whether installation of the given software upgrade failed on any of the one or more other computing devices; and
determining whether, following successful installation of the given software upgrade, any of the one or more other computing devices experienced performance impacts.

9. The apparatus of claim 4 wherein determining whether any issues were encountered on the one or more other computing devices as a result of the given software upgrade comprises utilizing a clustering algorithm to generate clusters of issue types for the given software upgrade based on a set of clustering factors.

10. The apparatus of claim 9 wherein the clustering algorithm comprises a density based clustering algorithm.

11. The apparatus of claim 9 wherein the set of clustering factors comprises:
alerts raised for issues encountered on respective ones of the one or more other computing devices, the alerts being associated with at least one of issues encountered due to installation of the given software upgrade and issues encountered following successful installation of the given software upgrade;
telemetry data collected from the one or more other computing devices at least one of prior to installation of the given software upgrade and following successful installation of the given software upgrade; and
information relating to one or more other software upgrades that caused issues on the one or more other computing devices.

12. The apparatus of claim 9 wherein the clusters of issue types for the given software upgrade comprise a first cluster for issues associated with failure installing the given software upgrade, a second cluster for issues associated with performance impacts following installation of the given software upgrade, and a third cluster for issues associated with system failure following installation of the given software upgrade.

13. The apparatus of claim 9 wherein determining whether any issues were encountered on the one or more other computing devices as a result of the given software upgrade further comprises determining whether the one or more other computing devices exhibiting at least the threshold level of similarity to the given computing device are matched with any of the generated clusters of issue types for the given software upgrade.

14. The apparatus of claim 13 wherein, responsive to determining that the one or more other computing devices exhibiting at least the threshold level of similarity to the given computing device are matched with a given one of the generated clusters of issue types for the given software upgrade, identifying root causes for the issues associated with the given generated cluster.

15. The apparatus of claim 14 wherein generating the recommendation as to whether to initiate download of the given software upgrade on the given computing device and initiating download of the given software upgrade on the given computing device based at least in part on the generated recommendation comprise:
converting the identified root causes to the one or more validation tests;
responsive to the one or more validation tests passing on the given computing device, initiating download of the given software upgrade on the given computing device automatically;
responsive to at least one of the one or more validation tests failing on the given computing device, pushing one or more additional warnings to the given computing device and initiating download of the given software upgrade on the given computing device responsive to acceptance of the one or more additional warnings.

16. The apparatus of claim 14 wherein generating the recommendation as to whether to initiate download of the given software upgrade on the given computing device and initiating download of the given software upgrade on the given computing device based at least in part on the generated recommendation comprise:
converting the identified root causes to the one or more warnings;
pushing the one or more warnings to the given computing device; and
initiating download of the given software upgrade on the given computing device responsive to acceptance of the one or more warnings.

17. The apparatus of claim 4 wherein generating the recommendation as to whether to initiate download of the given software upgrade on the given computing device and initiating download of the given software upgrade on the given computing device based at least in part on the generated recommendation comprise:
determining a probability that the given computing device will encounter one or more issues due to installation of the given software upgrade based at least in part on whether any issues were encountered on the one or more other computing devices as a result of the given software upgrade;
responsive to the determined probability that the given computing device will encounter one or more issues due to installation of the given software upgrade being below a designated threshold probability, initiating download of the given software upgrade on the given computing device automatically; and
responsive to the determined probability that the given computing device will encounter one or more issues due to installation of the given software upgrade being at or above the designated threshold probability, pushing the one or more warnings to the given computing device and initiating download of the given software upgrade on the given computing device responsive to acceptance of the one or more warnings.

18. A computer program product comprising a non-transitory processor-readable storage medium having stored therein program code of one or more software programs, wherein the program code when executed by at least one processing device causes the at least one processing device to perform steps of:

detecting that a given software upgrade is available for a given computing device;

identifying one or more other computing devices on which the given software upgrade has been installed that exhibit at least a threshold level of similarity to the given computing device;

determining whether any issues were encountered on the one or more other computing devices as a result of the given software upgrade;

generating a recommendation as to whether to initiate download of the given software upgrade on the given computing device based at least in part on whether any issues were encountered on the one or more other computing devices as a result of the given software upgrade; and initiating download of the given software upgrade on the given computing device based at least in part on the generated recommendation;

wherein generating the recommendation as to whether to initiate download of the given software upgrade on the given computing device and initiating download of the given software upgrade based at least in part on the generated recommendation comprise:

identifying two or more types of issues encountered on the one or more other computing devices as a result of the given software upgrade;

generating one or more validation tests based at least in part on one or more issues of a first one of the two or more issue types encountered on the one or more other computing devices as a result of the given software upgrade, wherein generating a given one of the one or more validation tests comprises determining a change in resource usage by at least one of the one or more other computing devices as a result of installation of the given software upgrade on said at least one other computing device;

generating one or more warnings based at least in part on one or more issues of a second one of the two or more issue types encountered on the one or more other computing devices as a result of the given software upgrade;

running the one or more validation tests on the given computing device, wherein running the given validation test comprises determining whether available resources of the given computing device are able to accommodate the determined change in resource usage associated with installation of the given software upgrade on said at least one other computing device; and determining whether to automatically initiate download of the given software upgrade on the given computing device based at least in part on results of the one or more validation tests run on the given computing device and one or more indicators relating to the one or more warnings, the results of the one or more validation tests run on the given computing device characterizing whether the given software upgrade will result in the given computing device experiencing at least one of the one or more issues encountered on the one or more other computing devices as a result of the given software upgrade.

19. The computer program product of claim 18 wherein determining whether any issues were encountered on the one or more other computing devices as a result of the given software upgrade comprises utilizing a clustering algorithm to generate clusters of issue types for the given software upgrade based on a set of clustering factors, the set of clustering factors comprising:

alerts raised for issues encountered on respective ones of the one or more other computing devices, the alerts being associated with at least one of issues encountered due to installation of the given software upgrade and issues encountered following successful installation of the given software upgrade;

telemetry data collected from the one or more other computing devices at least one of prior to installation of the given software upgrade and following successful installation of the given software upgrade; and information relating to one or more other software upgrades that caused issues on the one or more other computing devices.

20. The computer program product of claim 19 wherein the clusters of issue types for the given software upgrade comprise a first cluster for issues associated with failure installing the given software upgrade, a second cluster for issues associated with performance impacts following installation of the given software upgrade, and a third cluster for issues associated with system failure following installation of the given software upgrade.

* * * * *